United States Patent
Cieslak et al.

(10) Patent No.: US 11,579,997 B2
(45) Date of Patent: Feb. 14, 2023

(54) SELECTIVELY ENABLING FEATURES BASED ON RULES

(71) Applicant: Snap Inc., Santa Monica, CA (US)

(72) Inventors: Michael Ronald Cieslak, Los Angeles, CA (US); Jiayao Yu, Venice, CA (US); Kai Chen, Manhattan Beach, CA (US); Farnaz Azmoodeh, Venice, CA (US); Michael David Marr, Monroe, WA (US); Jun Huang, Beverly Hills, CA (US); Zahra Ferdowsi, Marina del Rey, CA (US)

(73) Assignee: SNAP INC., Santa Monica, CA (US)

( * ) Notice: Subject to any disclaimer, the term of this patent is extended or adjusted under 35 U.S.C. 154(b) by 37 days.

(21) Appl. No.: 17/215,378

(22) Filed: Mar. 29, 2021

(65) Prior Publication Data

US 2021/0216426 A1 Jul. 15, 2021

Related U.S. Application Data

(63) Continuation of application No. 16/384,490, filed on Apr. 15, 2019, now Pat. No. 10,990,495.

(51) Int. Cl.
*G06F 8/65* (2018.01)
*G06F 11/30* (2006.01)
(Continued)

(52) U.S. Cl.
CPC ............ *G06F 11/3051* (2013.01); *G06F 8/65* (2013.01); *G06F 8/70* (2013.01); *G06F 11/3003* (2013.01);
(Continued)

(58) Field of Classification Search
CPC ..... G06F 8/65; G06F 11/3051; H04L 41/0866
See application file for complete search history.

(56) References Cited

U.S. PATENT DOCUMENTS

| 10,990,495 B1 | 4/2021 | Cieslak et al. |
| 2014/0068588 A1* | 3/2014 | Tan ........................ G06F 8/656 717/169 |

(Continued)

OTHER PUBLICATIONS

"U.S. Appl. No. 16/384,490, Non Final Office Action dated Jul. 8, 2020", 14 pgs.

(Continued)

*Primary Examiner* — David E Martinez
(74) *Attorney, Agent, or Firm* — Schwegman Lundberg & Woessner, P.A.

(57) ABSTRACT

Aspects of the present disclosure involve a system and method for performing operations comprising providing to a client device, a messaging application comprising multiple features; accessing a configuration rule that associates a device property rule with a feature; determining at a first point in time, that a property of the client device matches the device property rule associated with the configuration rule; in response to determining that the property of the client device matches the device property rule associated with the configuration rule, enabling the feature on the client device at the first point in time; receiving an updated property of the client device at a second point in time; and in response to determining that the updated property of the client device fails to match the device property rule associated with the configuration rule at the second point in time, disabling the feature on the client device.

20 Claims, 10 Drawing Sheets

(51) Int. Cl.
  *H04L 12/24* (2006.01)
  *H04L 67/04* (2022.01)
  *G06F 8/70* (2018.01)
  *H04L 51/00* (2022.01)
  *G06F 11/34* (2006.01)
  *H04L 41/0866* (2022.01)

(52) U.S. Cl.
  CPC ...... *G06F 11/3055* (2013.01); *G06F 11/3058* (2013.01); *G06F 11/3428* (2013.01); *H04L 41/0866* (2013.01); *H04L 51/00* (2013.01); *H04L 67/04* (2013.01)

(56) References Cited

U.S. PATENT DOCUMENTS

| | | | | |
|---|---|---|---|---|
| 2015/0261518 | A1* | 9/2015 | Viswanathan | G06F 8/65 717/168 |
| 2018/0341762 | A1* | 11/2018 | Gravenites | G06F 21/62 |

OTHER PUBLICATIONS

"U.S. Appl. No. 16/384,490, Response filed Oct. 7, 2020 to Non Final Office Action dated Jul. 8, 2020", 11 pgs.
"U.S. Appl. No. 16/384,490, Notice of Allowance dated Dec. 23, 2020", 7 pgs.

* cited by examiner

US 11,579,997 B2

SELECTIVELY ENABLING FEATURES BASED ON RULES

This application is a continuation of U.S. patent application Ser. No. 16/384,490, filed on Apr. 15, 2019, which is incorporated herein by reference in its entirety.

TECHNICAL FIELD

The present disclosure relates generally to application features in messaging applications.

BACKGROUND

As consumption of content on mobile devices continues to grow, application developers seek new ways to engage users. Application developers constantly release new versions of their applications that have additional features to keep their users interested. Application developers, though, infrequently consider the capabilities of the hardware devices used to run the applications which can negatively impact the new application releases.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
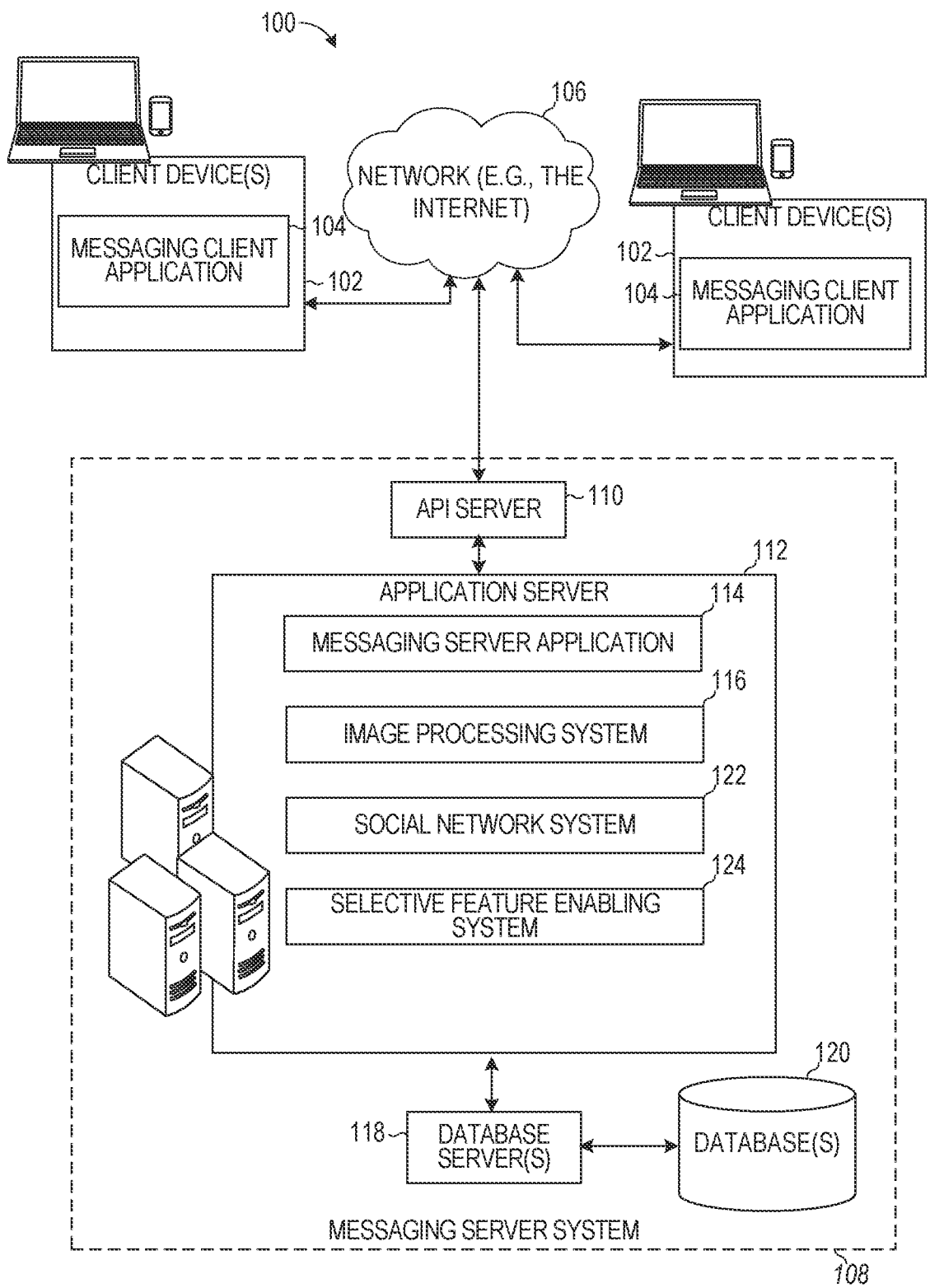
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, application developers release new versions of their applications to add, remove, or modify features of their applications. In developing new versions of the applications, though, the application developers rarely consider the impact of the features on the underlying hardware. Specifically, features added to new application versions grow in complexity at a faster rate than that which the hardware capabilities of the devices on which the applications run can handle. As a result, when the new versions of the applications are released, the devices running the new versions experience severe lag and over-consumption of resources, such as faster battery drain. This not only negatively impacts how the new version of the application runs on the device but also negatively impacts other applications that are running on the device. This results in a poor user experience and unnecessary waste of resources.

The disclosed embodiments improve the efficiency of using the electronic device by automatically selectively enabling/disabling a given application feature based on determining whether resources of the device consumed by the feature exceed the underlying capabilities of a device. Specifically, the disclosed embodiments provide, to a client device, a messaging application that includes a plurality of features. The disclosed embodiments access a configuration rule that associates a first device property rule, such as the operating system version, the application version, the device model, the build of the application, the processor of the device, and so forth, with a first feature of the plurality of features of the messaging application. The disclosed embodiments determine that a first property of the client device matches the first device property rule associated with the first configuration rule, and in response, enable the first feature of the plurality of features on the client device. In cases where the first property of the client device fails to match the first device property rule associated with the first configuration rule, the disclosed embodiments disable the first feature on the client device.

In this way, features of the messaging application that do not satisfy configuration rules associated with the features, thereby indicating that the features exceed capabilities of the device, remain disabled or are disabled. This increases the efficiency of running the messaging application on the device without wasting resources or degrading the overall user experience. In particular, rather than avoiding launching or running the messaging application on the device, such as because it has features that exceed the capabilities of the device, those features that exceed the capabilities are turned OFF or disabled, which allows the messaging application to run on the device without overly burdening the memory, bandwidth, and processing resources of the device.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104 and between a messaging client application 104 and the messaging server system 108 includes functions (e.g., commands to invoke functions) as well as payload data (e.g., text, audio, video, or other multimedia data).

The messaging client application 104 includes multiple features. For example, the messaging client application 104 can include a maps feature that allows a user to see where his/her contacts or friends are geographically in a graphical map-based interface. The messaging client application 104 can include a messaging feature allowing a user to exchange messages with one or more friends. The messaging client application 104 can include a games feature allowing a user to play games via the messaging client application 104 with one or more friends on the messaging client application 104. The messaging client application 104 can include a memories feature in which images and videos captured by the user using a camera-enabled device running the messaging client application 104 are stored. The messaging client application 104 can include a discover feature allowing the user to access a graphical user interface in which content, such as videos and images, that other users of the messaging client application 104, which are friends or not friends of the user, captured, submitted and posted. The messaging client application 104 can include a friends feed feature which shows a user a chronologically-arranged list of status updates, images, videos, and content generated and associated with the user's friends. The messaging client application 104 can include an image recognition feature that processes a real-time or stored video or image to identify and recognize objects depicted in the video or image.

The messaging client application 104 can include an avatar feature which allows a user to create an animated avatar representation of the user to be shared with the user's friends and to view avatar representations of the user's friends on the messaging client application 104 in any of the graphical user interfaces of the messaging client application 104, such as in the map-based graphical user interface. The messaging client application 104 can include a lens feature allowing the user to overlay two-dimensional (2D) or three-dimensional (3D) graphical virtual objects (such as filters or geographically-relevant content) onto a scene depicted in real-time or stored images or videos that are/were captured by a camera-enabled device running the messaging client application 104. The messaging client application 104 can include a video encoding or decoding feature allowing a user device to capture and store a video in one or more formats and/or transcode a previously captured video. The messaging client application 104 can include an encryption feature allowing a user to encrypt/decrypt messages or content exchanged using the messaging client application 104 with one or more other users. The messaging client application 104 can include a backup feature which automatically stores copies, on a server, of content the messaging client application 104 captured using the device running the messaging client application 104.

Any one or combination of these and other features discussed above and below of the messaging client application 104 may be installed and integrated in the messaging client application 104 when the messaging client application 104 is initially downloaded and installed on the client device 102. In an embodiment, certain ones of the features of the messaging client application 104, even though they are installed with the messaging client application 104 on the client device 102, are in a disabled state by default. This means that when the messaging client application 104 runs or is launched and executed on the client device 102, the features are inaccessible and invisible to the user. Namely, options to access the disabled features are prevented from being displayed in any graphical user interface of the messaging client application 104, In some implementations, the messaging client application 104 can enable a feature that is by default in a disabled state. In such cases, after the feature is enabled, the messaging client application 104 presents an option to a user in a graphical user interface allowing the user to access the feature. In some embodiments, in cases where a particular feature is disabled by default, when any of multiple configuration rules that are associated with the particular feature matches or is satisfied by properties of the client device 102 and/or the user of the client device 102, the selective feature enabling system 124 uses a prioritization or ranking technique to select one of the multiple configuration rules to override the default disabled state of the particular feature.

In some embodiments, the messaging client application 104 is downloaded and installed on the client device 102 only with those features that are in an enabled state. When a new feature is requested or is needed to be added to the messaging client application 104 at some later point in time, the new feature is downloaded from the server (e.g., code corresponding to the new feature is retrieved from the server) and integrated into the messaging client application 104. The messaging client application 104 can then use the newly downloaded code to enable a user to launch the new feature.

In some embodiments, the messaging client application 104 communicates with a selective feature enabling system 124 to identify one or more features of the messaging client application 104 to enable or disable. The selective feature enabling system 124 utilizes a set of configuration rules to identify which features to enable or disable. In an embodiment, the selective feature enabling system 124 receives an identifier of the client device 102 on which the messaging client application 104 is implemented. The selective feature enabling system 124 uses the identifier to retrieve a set of configuration rules associated with the client device 102. Specifically, the selective feature enabling system 124 can determine one or more properties of the client device 102, such as a device type, available memory storage space, current battery, level, disk level attributes, operating system version, messaging client application 104 version, processor type, or any other hardware capability of the client device 102 using the identifier. In an embodiment, the selective feature enabling system 124 searches a database to retrieve the set of configuration rules associated with the identifier.

In an embodiment, the selective feature enabling system 124 selects a particular feature of the messaging client application 104 that is enabled or disabled currently on the messaging client application 104 that is running or installed on the client device 102. The selective feature enabling system 124 identifies a set of configuration rules or just one configuration rule that is associated with the particular feature. In cases where multiple configuration rules are associated with the particular feature, the selective feature enabling system 124 uses a prioritization or ranking technique to select only one of the multiple configuration rules. Once the configuration rule is selected, the selective feature enabling system 124 obtains one or more device property rules and/or one or more user information rules specified in the configuration rule. For example, the configuration rule can specify a particular Boolean, scalar or complex construct expression that logically or otherwise combines the one or more device property rules and/or one or more user information rules. The selective feature enabling system 124 evaluates whether the configuration rule is satisfied (e.g., the expression of the rule is determined to be TRUE) or not satisfied (e.g., the expression of the rule is determined to be FALSE) using device properties and/or user information of the client device 102.

In some embodiments, the selective feature enabling system 124 communicates a portion of the configuration rule (e.g., a given portion of the expression of the rule) to be evaluated by the client device 102. In this way, some information that is available only to the client device 102 and is not available to the selective feature enabling system 124 and is included in the configuration rule can be used to determine if the rule is satisfied. Namely, a first portion of the configuration rule can be evaluated by the selective feature enabling system 124 and a second portion of the same configuration rule can be evaluated by the client device 102. The client device 102 can transmit the results of the evaluation of the second portion of the configuration rule to the selective feature enabling system 124 to be combined with the results of the evaluation of the first portion. For example, the selective feature enabling system 124 does not have access to information such as the amount of free memory, current battery level, or the currently available bandwidth of the client device 102 but does have information indicating the processor speed and type of the client device 102. Namely, certain information about the client device 102 remains physically unchangeable and so can be stored on the selective feature enabling system 124 for access independently of the client device 102. Other information dynamically changes throughout the life of the device, such as the currently available bandwidth or battery level, current geographical location, and so when such information is included in the configuration rule parameters, the client device 102 needs to be involved in evaluating that portion of the configuration rule.

In some embodiments, as part of having the client device 102 evaluate a rule, the selective feature enabling system 124 transmits a benchmark associated with the rule that represents functionality of the feature associated with the rule. The client device 102 can run the benchmark by executing code included in the benchmark and provide performance results to the selective feature enabling system 124 of how the client device 102 ran the benchmark. The selective feature enabling system 124 can then use the performance results to evaluate parameters of the configuration rule. This way, before a feature of the messaging client application 104 is enabled on the client device 102, the benchmark representing functions of the feature can be run by the client device 102 to verify that the feature will run without degrading or negatively impacting the messaging client application 104 or other applications installed and running on the client device 102. Specifically, the benchmark may be designed to consume the same amount and types of processor capabilities and resources of a given device as the associated feature of the messaging client application 104. This allows the selective feature enabling system 124 to test whether the processor capabilities and device resources required by the corresponding feature of the messaging client application 104 are available on the client device 102 using the benchmark without and before enabling the particular feature.

In an embodiment, when the selective feature enabling system 124 determines that the configuration rule is not satisfied (e.g., because any one or combination of parameters of the expression specified by the rule is not met by or do not match the device properties and/or user information of the client device 102), the selective feature enabling system 124 maintains the feature associated with the configuration rule in a disabled state. Alternatively, if the feature was previously enabled, then the selective feature enabling system 124 now changes the feature to be in a disabled state. When the selective feature enabling system 124 determines that the configuration rule is satisfied (e.g., the combination of parameters of the expression specified by the rule are all met by or match the device properties and/or user information of the client device 102), the selective feature enabling system 124 maintains the feature associated with the configuration rule in an enabled state or transitions the state of the feature from a disabled state to an enabled state. In some circumstances, the selective feature enabling system 124 transmits code segments of the particular feature that is being transitioned to the enabled state to the client device 102 to update the messaging client application 104 and enable the messaging client application 104 to access the particular feature.

In some embodiments, the configuration rules stored in the database accessible to the selective feature enabling system 124 are dynamically updated to include new rules or to change or delete previously stored rules. Such updates are performed by providing application developers or developers of the messaging client application 104 with access via a graphical user interface to the rules. The application developer can define a new configuration rule using the graphical user interface by specifying various parameters such as a Boolean expression that logically combines one or more device property rules and/or one or more user information rules and identifies an action associated with a feature of the particular messaging client application 104 to perform when the parameters of the configuration rule are satisfied. Such an action can include enabling the feature, disabling the feature, modifying components of the feature, downloading additional code associated with the feature, prefetching video content for a particular user, and so forth. The graphical user interface may also allow the developer to assign a priority or rank to the configuration rule which may be used by the selective feature enabling system 124 when a given feature is associated with multiple matching configuration rules. The graphical user interface may also allow the developer to specify a set of portions of the configuration rule to be evaluated by the selective feature enabling system 124 and another set of portions of the configuration rule to be evaluated by the client device 102. As referred to herein, evaluating a rule means comparing current data (e.g., current device properties and/or user information) with the combination of the corresponding rule parameters to determine whether those parameters match the current data. Namely, evaluating a rule means determining whether an expression of the rule is TRUE or FALSE given the current data associated with the rule parameters.

As an example, a configuration rule includes an expression that, when satisfied, instructs the messaging client application 104 to prefetch or automatically download a set of videos or images provided by other users of the messaging client application 104. Such an expression can include a logical AND operation of a first device property rule (e.g., battery level exceeds 70), a second device property rule (e.g., the device is part of a cluster of devices that is greater than 6), and a logical OR operation of a third device property rule (e.g., bandwidth of the device is greater than 100 Mbps) and a user information rule (e.g., a user consumes more than 25 videos that were provided by other users per day). As such, in a given circumstance in which a given client device 102 has a battery level of 80 that exceeds the battery level 70 specified by the first device property rule, is part of a device cluster that exceeds 6 devices, and has a bandwidth greater than 100 Mbps or is used by a user that consumes more than 25 videos provided by other users per day; the selective feature enabling system 124 instructs the messaging client application 104 to prefetch or automatically download a set of videos or images provided by other users of the messaging client application 104.

The messaging server system 108 provides server-side functionality via the network 106 to a particular messaging client application 104. While certain functions of the messaging system 100 are described herein as being performed either by a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114, for possible access by another messaging client application 104; the setting of a collection of media data (e.g., story); the retrieval of such collections; the retrieval of a list of friends of a user of a client device 102; the retrieval of messages and content; the adding and deleting of friends to and from a social graph; the retrieval of one or more features (e.g., executable code segments of the one or more features) of the messaging client application 104, such as features that are in a disabled state on the messaging client application 104; the location of friends within a social graph; access to user conversation data; access to avatar information stored on the messaging server system 108; and the opening of an application event (e.g., relating to the messaging client application 104).

The application server 112 hosts a number of applications and subsystems, including the messaging server application 114, an image processing system 116, a social network system 122, and the selective feature enabling system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a, message at the messaging server application 114.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with whom a particular user has relationships or whom the particular user is "following," and also the identification of other entities and interests of a particular user. Such other users may be referred to as the user's friends. The social network system 122 may access location information associated with each of the user's friends to determine where they live or are currently located geographically. The social network system 122 may maintain a location profile for each of the user's friends indicating the geographical location where the user's friends live.

The application server 112 is communicatively coupled to the database server 118, which facilitates access to the database 120 in which is stored data associated with messages processed by the messaging server application 114.

Figure 2:
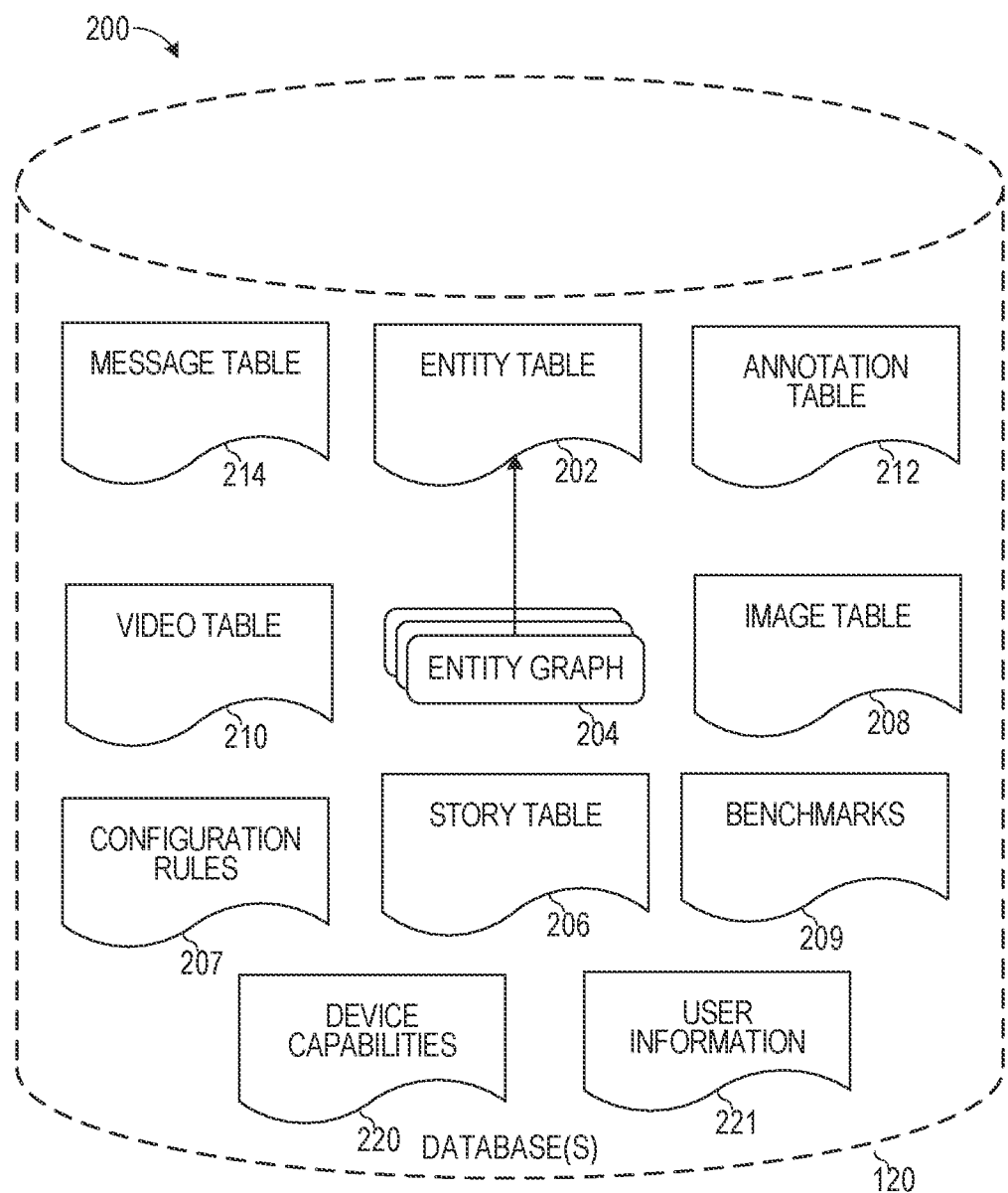
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

The message table 214 may store a collection of conversations between a user and one or more friends or entities. The message table 214 may include various attributes of each conversation, such as the list of participants, the size of the conversation (e.g., number of users and/or number of messages), the chat color of the conversation, a unique identifier for the conversation, and any other conversation-related feature(s).

The database 120 also stores annotation data, in the example form of filters, in an annotation table 212. The database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 208 is so-called "lens" data. A "lens" may be a real-time special effect and sound that may be added to an image or a video.

Configuration rules 207 stores a set of configuration rules associated with different features of the messaging client application 104. In some cases, multiple configuration rules 207 are associated with the same feature of the messaging client application 104. In some cases, only one configuration rule is associated with a corresponding one of the features of the messaging client application 104. The configuration rules 207 may be indexed by device type, build of the messaging client application 104, version of the messaging client application 104, geographical location, processor type, user attribute, user friends, or any other suitable device property or user information or combination of information. Rules stored in the configuration rules 207 can be accessed by any component in the system and/or by authorized devices or users. Rules can be added, modified, or deleted to/from the configuration rules 207 via a graphical user interface presented to an application developer of the messaging client application 104. In some embodiments, configuration rules stored in the configuration rules 207 are associated with an owner (e.g., a creator of the rule) and, in such cases, the configuration rules 207 can only be modified or deleted by the associated owner using an owner identifier.

Certain rules stored in the configuration rules 207 can be selectively activated based on a time of day, device context or other suitable attribute. Inactive rules are not used in evaluating whether a given device satisfies a rule to perform an action for a feature of the messaging client application 104.

Benchmarks 209 stores a set of benchmarks associated with different features of the messaging client application 104. In some cases, multiple benchmarks are associated with the same feature of the messaging client application 104. In some cases, only one benchmark is associated with a corresponding one of the features of the messaging client application 104. Each benchmark in benchmarks 209 simulates various processor and device operations that the corresponding feature of the messaging client application 104 performs. In some cases, different benchmarks can be associated with different device types, builds of the messaging client application 104, versions of the messaging client application 104, geographical locations, processor types, user attributes, user friends, or any other suitable device property or user information or combination of information. The benchmarks 209 store snippets of code that represent operations performed by the corresponding feature of the messaging client application 104. In some cases, the snippets of code include simulations of only the most complex operations performed by the feature of the messaging client application 104.

Device capabilities 220 stores a list of standard resources, processor types, memory types and other suitable device properties of different device models and types. In some cases, each client device 102 of the messaging client application 104 may provide, upon installation of the messaging client application 104, its corresponding standard physical capabilities. Such capabilities can be stored and indexed by a device identifier associated with the client device 102. In some embodiments, the device capabilities 220 stores dynamic device properties, such as battery levels, available storage space, network type, and bandwidth for one or more client devices 102. In such cases, the dynamic device properties for a given device can be updated periodically or continuously by polling or requesting such information from the given device. In some cases, the device capabilities 220 groups various devices and their capabilities into clusters of devices of similar types by grouping the corresponding identifiers of the devices into the same cluster of devices. In some embodiments, the device capabilities 220 organizes and clusters the device capabilities 220 by friends associated with the devices such that device capabilities 220 of devices used by a given collection of friends, as indicated by the entity graph 204, is grouped together. In some embodiments, the device capabilities 220 organizes and clusters the device by geographical region associated with the devices.

User information 221 stores profiles for various users of the messaging client application 104. Such information may include how active each user is, which features of the messaging client application 104 each user frequently uses, user upload history, developer status, whether the user is a beta tester, how often a given feature of the messaging client application 104 is used by each user, a geographical location associated with each user, and any other suitable information or combination of such information. The user information 221 is updated continuously or periodically as users utilize the messaging client application 104.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

A story table 206 stores data regarding collections of messages and associated image, video, or audio data, which are compiled into a collection (e.g., a story or a gallery). The creation of a particular collection may be initiated by a particular user (e.g., any user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
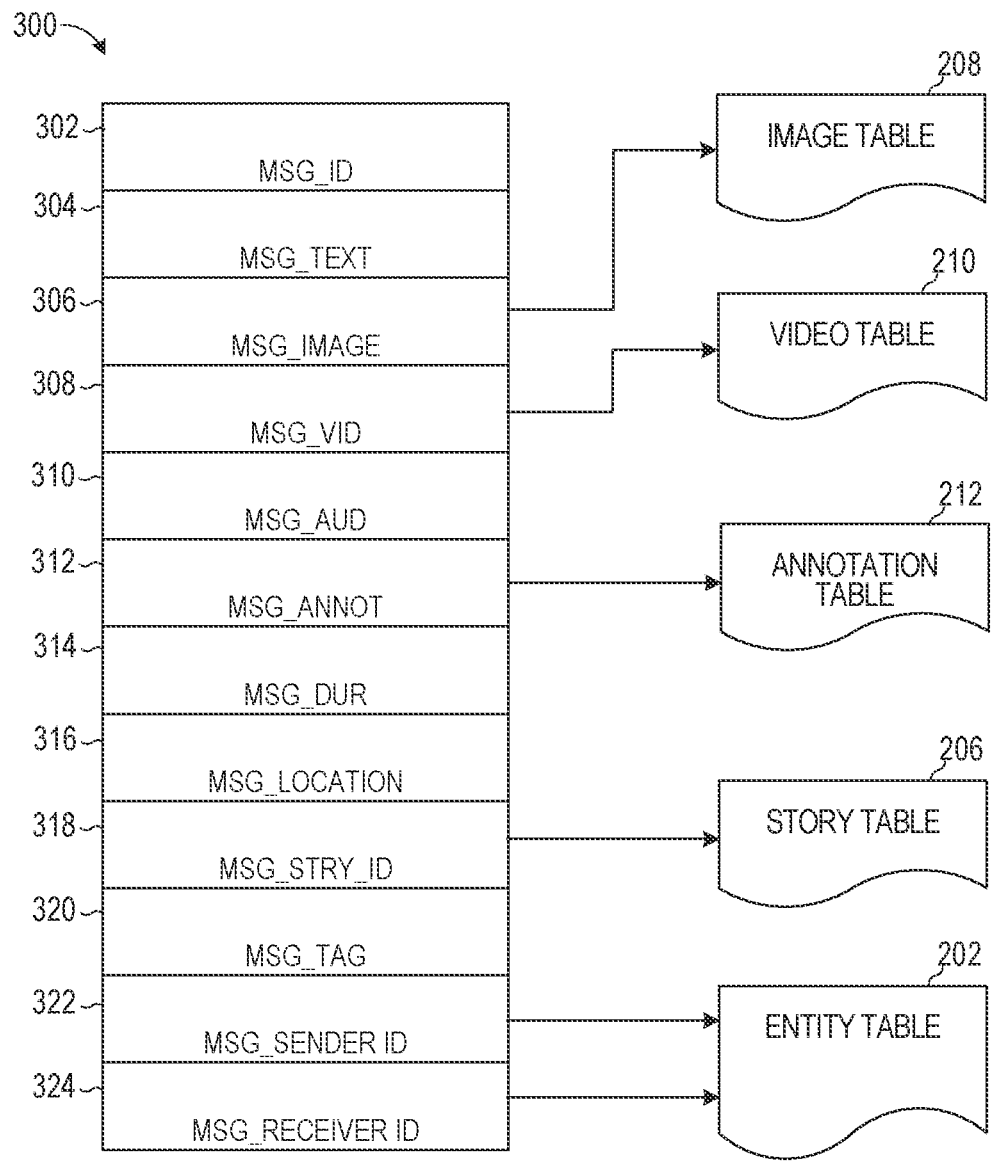
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to the message image payload 306, message video payload 308, or message audio payload. 310 of the message 300.

A message duration parameter 314: a parameter value indicating, in seconds, the amount of time for which content of the message 300 (e.g., the message image payload 306, message video payload 308, or message audio payload 310) is to be presented or made accessible to a user via the messaging client application 104.

A message geolocation parameter 316: geolocation data (e.g., latitudinal and longitudinal coordinates) associated with the content payload of the message 300. Multiple message geolocation parameter 316 values may be included in the payload, with each of these parameter values being associated with content items included in the content (e.g., a specific image within the message image payload 306, or a specific video in the message video payload 308).

A message story identifier 318: an identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, using image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of one or more users of the client device(s) 102 to which the message 300 is addressed. In the case of a conversation between multiple users, the identifier may indicate each user involved in the conversation.

The contents (e.g., values) of the various components of the message 300 may be pointers to locations in tables within which content data values are stored. For example, an image value in the message image payload 306 may be a pointer to (or address of) a location within the image table 208. Similarly, values within the message video payload 308 may point to data stored within the video table 210, values stored within the message annotations 312 may point to data stored in the annotation table 212, values stored within the message story identifier 318 may point to data stored in the story table 206, and values stored within the message sender identifier 322 and the message receiver identifier 324 may point to user records stored within the entity table 202.

Figure 4:
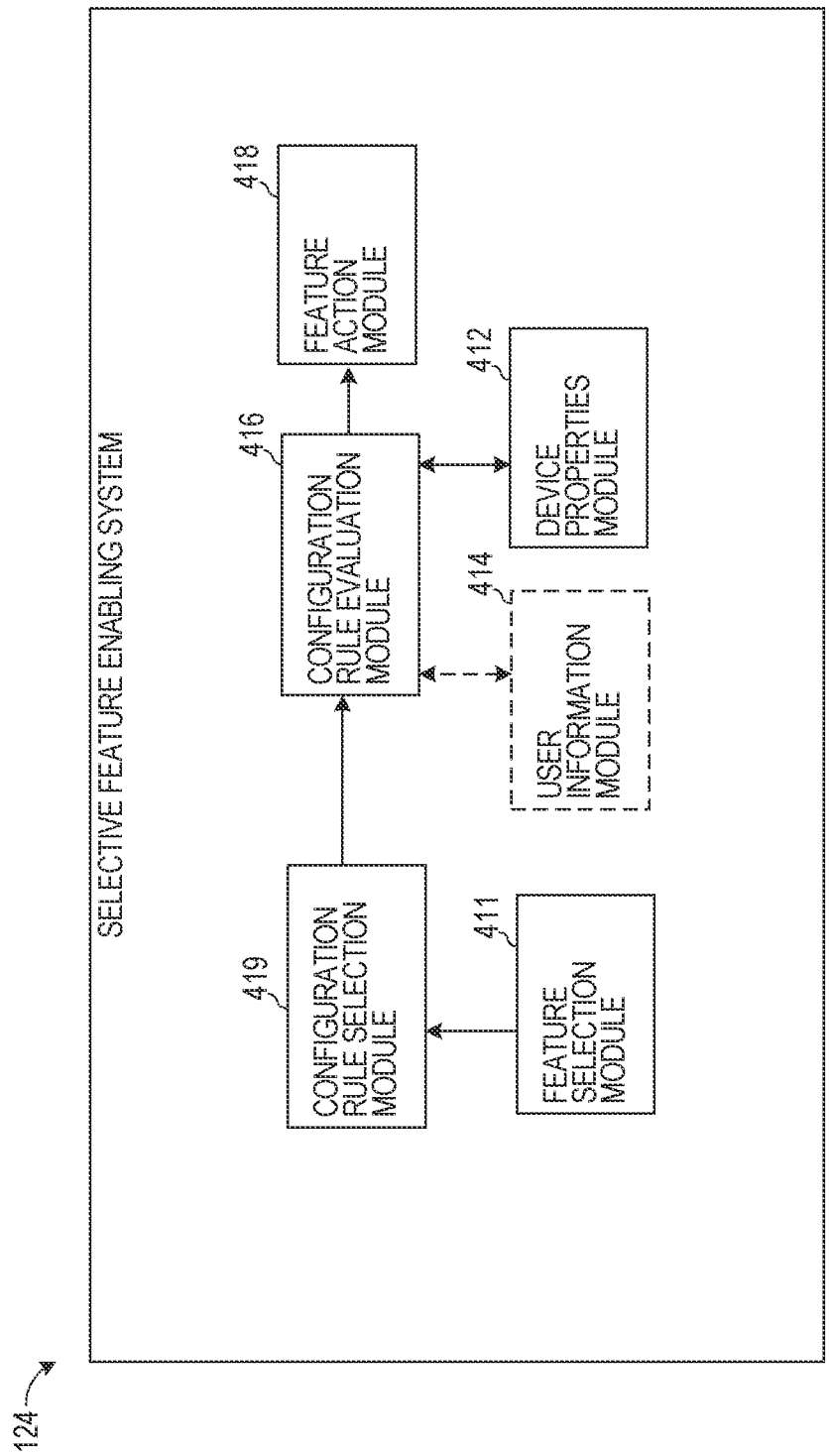
FIG. 4 is a block diagram showing an example selective feature enabling system, according to example embodiments.

FIG. 4 is a block diagram showing an example selective feature enabling system 124, according to example embodiments. The selective feature enabling system 124 includes a feature selection module 411, a configuration rule selection module 419, a configuration rule evaluation module 416, a user information module 414, a device properties module 412, a configuration rule evaluation module 416, and a feature action module 418.

Feature selection module 411 communicates with a messaging client application 104 implemented on a given client device 102 to identify a feature of the messaging client application 104 to analyze. The feature can be a feature that is currently enabled or is currently disabled. In an embodiment, the feature selection module 411 cycles through a predetermined list of features over time to verify that the feature should be in their enabled or disabled state and change their state if a given configuration rule is satisfied indicating a state change is needed.

The feature selection module 411 may access user information 221 to infer user behavior and interest in having a particular feature of the messaging client application 104 enabled. For example, the user information 221 may indicate that the user has recently started using the camera of the camera-enabled device on which the messaging client application 104 is implemented to capture and share videos. The feature selection module 411 may also determine that the lens feature (e.g., a feature that utilizes object recognition and allows a user to insert 2D or 3D graphical objects) is currently disabled on the device and is a feature that is popular among the user's friends or a set of users who frequently share videos. The feature selection module 411 may, in response, communicate the selected feature to the configuration rule selection module 419 to determine whether or not to activate the feature or perform an action associated with the feature. Similarly, the feature selection module 411 may determine that the lens feature is currently enabled but that the user of the device on which the feature is enabled has not captured video using the camera-enabled device in over a threshold period of time. In response, feature selection module 411 may communicate the selected feature to the configuration rule selection module 419 to determine whether or not to de-activate or disable the feature or perform an action associated with the feature.

As another example, the feature selection module 411 may determine that a geographical location of the user of the messaging client application 104 has changed. In response, the feature selection module 411 may identify a set of features that are location dependent and provide one or more of the identified features to the configuration rule selection module 419 to determine whether an action should be performed for such features. As another example, the feature selection module 411 receives a version identifier or client device 102 identifier and retrieves a set of features that are disabled on the client device 102. The feature selection module 411 provides the retrieved set of features to the configuration rule selection module 419 for analysis as to whether to enable the features. Similarly, the feature selection module 411 receives a version identifier or client device 102 identifier and retrieve a set of features that are enabled on the client device 102. The selection module 411 provides the retrieved set of features to the configuration rule selection module 419 for analysis as to whether to disable the features.

Configuration rule selection module 419 retrieves one or more configuration rules from configuration rules 207 that are associated with the features received from the feature selection module 411. The configuration rule selection module 419 determines which configuration rules, that are associated with the feature, are active and associated with the device identifier and/or user identifier. The configuration rule selection module 419 determines whether multiple such configuration rules match and are associated with the selected feature. In response, the configuration rule selection module 419 retrieves a rank associated with each rule and selects the configuration rule with the highest rank. Alternatively, or in addition, the configuration rule selection module 419 analyzes a Boolean tree associated with the expression of each configuration rule. Specifically, the configuration rule selection module 419 compares the expressions of each configuration rule that is associated with the same feature and selects the configuration rule with the longest expression.

The configuration rule selection module 419 provides the selected configuration rule to the configuration rule evaluation module 416. The configuration rule evaluation module 416 analyzes the expression contained in the selected rule to determine which parameters need to be evaluated. For example, the configuration rule evaluation module 416 identifies one or more device property rules contained in the expression and/or user information rules contained in the expression. The configuration rule evaluation module 416 also determines whether the rule specifies a particular portion of the expression that needs to be evaluated by the client device 102. The configuration rule evaluation module 416 communicates with the user information module 414 to obtain user information 221 corresponding to the user information rule and/or with the device properties module 412 to obtain device properties corresponding to the device properties rules contained in the expression.

As an example, the configuration rule includes a first device property rule (e.g., a bandwidth greater than 1 Mbps) and a second device property rule (e.g., a minimum version of the messaging client application 104). As a result, the configuration rule evaluation module 416 communicates with the device properties module 412, and provides the client device 102 identifier to the device properties module 412, to obtain the first device property (e.g., the current bandwidth of the client device 102) and the second device property (e.g., the current version of the messaging client application 104 installed on the client device 102) associated with the first and second device property rules. The device properties module 412 accesses the device capabilities 220 to retrieve the corresponding first and second device properties associated with the identifier of the client device 102. If the device capabilities 220 only has the first property and not the second property, the device properties module 412 communicates directly with the client device 102 to obtain the current value of the second property.

The configuration rule may also include a first user information rule (e.g., a beta user attribute) and a second user information rule (e.g., accesses or consumes more than 25 videos from other users per day). As a result, the configuration rule evaluation module 416 communicates with the user information module 414, and provides the user identifier to the user information module 414, to obtain the first user information (e.g., the status of the user, such as whether the user is a beta user) and the second user information (e.g., the number of videos from other users the user consumes per day). The user information module 414 retrieves the first and second user information from user information 221 and returns the information to the configuration rule evaluation module 416.

In some implementations, the configuration rule evaluation module 416 sends a portion of the expression to the client device 102 for the client device 102 to evaluate the portion of the expression. For example, the portion of the expression may specify that a particular benchmark result has to exceed a given minimum threshold performance. As a result, the configuration rule evaluation module 416 transmits the portion of the expression including the benchmark, retrieved from benchmarks 209, to the client device 102 with an instruction for the client device 102 to run the benchmark. The client device 102, after running the benchmark, may determine whether the performance exceeds the threshold indicated in the portion of the expression and provide this evaluation to the configuration rule evaluation module 416. In some implementations, the configuration rule evaluation module 416 only sends the portion of the expression to the client device 102 after verifying that another portion of the expression, evaluated at the server, is satisfied. Namely, the configuration rule evaluation module 416 evaluates the portions of the expression with the currently available information on the server and if those portions are satisfied, a remaining set of portions of the expression are sent to the client device 102 for evaluation.

In some embodiments, the configuration rule evaluation module 416 sends an instruction to the client device 102 to re-evaluate the expression at a later point in time if the expression is currently satisfied. If the expression is later no longer satisfied, the client device 102 may automatically disable the feature or perform an action associated with the feature.

After the configuration rule evaluation module 416 obtains all of the parameters for the expression (e.g., all of the needed device properties and/or user information 221), the configuration rule evaluation module 416 determines whether the Boolean expression is satisfied. Namely, the configuration rule evaluation module 416 determines whether all or some of the received information matches the specified rules or Boolean combination of the rules.

In response to determining that the expression is satisfied, the configuration rule evaluation module 416 instructs the feature action module 418 to perform the action associated with the rule (e.g., enable the feature, disable the feature, or modify the feature). The feature action module 418 retrieves the action specified for the configuration rule from the configuration rules 207 and then executes the corresponding action. For example, the feature action module 418 transmits code for implementing the feature to the client device 102 to install and implement the feature into the messaging client application 104, Alternatively, the feature action module 418 sends a message 300 to the messaging client application 104 with instructions to enable the feature that is currently installed but disabled on the messaging client application 104. Alternatively, the feature action module 418 sends a message 300 to the messaging client application 104 with instructions to disable or de-activate the feature that is currently installed and enabled on the messaging client application 104.

As one example, a first feature that the feature selection module 411 selects includes object recognition of an image stored on the client device 102. The configuration rule selected by the configuration rule selection module 419 associates a plurality of device property rules including first, second and third device property rules with the first feature. In such circumstances, a current battery level and current amount of available storage is received by the device properties module 412 from the client device 102. The configuration rule evaluation module 416 on the server determines that processing capabilities of the client device 102 exceed threshold processing capabilities indicated by the first device property rule, the current battery level exceeds a minimum battery level indicated by the second device property rule, and the current amount of available storage exceeds a minimum available storage amount indicated by the third device property rule. Prior to enabling the first feature on the client device 102, the server instructs the client device 102 to determine whether an updated battery level of the client device 102 exceeds the minimum battery level indicated by the second device property rule and that an updated amount of available storage of the client device 102 exceeds the minimum available storage amount indicated by the third device property rule.

This way, even though a given rule is satisfied when evaluated based on a first set of device properties is received by the server, the client device 102 can double check that after the feature associated with the given rule is enabled, the given rule is still satisfied at some later point in time. Namely, the time between when the server evaluates the rule and when the client is instructed to enable the feature may be large enough such that the battery level on the client device 102 drops below an allowable minimum. To ensure that the battery level is still above the allowable minimum after the time has past since the server evaluated the rule, the client device 102 can test and evaluate the current battery level against the rule prior to enabling the feature and/or while the feature is enabled to determine whether to disable the feature.

As another example, a second feature that the feature selection module 411 selects includes image backup functionality for the client device 102. The configuration rule selected by the configuration rule selection module 419 may specify upload stability data and transcoding success parameters with enabling the image backup functionality. The configuration rule evaluation module 416 retrieves information indicating upload stability data for the client device 102 and a transcoding failure rate of the client device 102 from the device properties module 412. The configuration rule evaluation module 416 determines whether the upload stability data exceeds a stability threshold indicated by the rule and that the transcoding failure rate exceeds a transcoding failure rate threshold indicated by the rule. In response to determining that the upload stability data exceeds the stability threshold and that the transcoding failure rate exceeds the transcoding failure rate threshold, the configuration rule evaluation module 416 enables the image backup functionality for the client device 102 to backup images captured by the client device 102, such as by instructing the feature action module 418 to enable this feature on the client device 102.

As another example, a third feature that the feature selection module 411 selects includes a graphical eraser operation that enables a user to erase portions of an image captured by the client device 102. The configuration rule selected by the configuration rule selection module 419 may specify minimum performance capabilities a client device 102 needs to operate the graphical eraser operation feature. The configuration rule evaluation module 416 retrieves information indicating a performance metric of the graphical eraser operation by executing a benchmark on the client device 102 representing operations performed by the graphical eraser operation or retrieving a performance metric indicating how the benchmark performed on devices similar to the client device 102 in the past. The configuration rule evaluation module 416 determines that the performance metric exceeds a minimum performance threshold indicated by the first device property rule, in response to determining that the performance metric exceeds the minimum performance threshold indicated by the first device property rule, the configuration rule evaluation module 416 enables the graphical eraser operation for the client.

As another example, a fourth feature that the feature selection module 411 selects includes a lens creation or complex lens operations (e.g., creation of a graphical element that is added to a captured image or complex operations associated with such a graphical element, such as animation, scaling, pixelation, and so forth) that enables a user to add graphical elements to images captured by the client device 102. The configuration rule selected by the configuration rule selection module 419 may specify minimum performance capabilities a client device 102 needs to operate the lens creation or complex lens operations features. The configuration rule evaluation module 416 retrieves information indicating a performance metric of the lens creation or complex lens operations by executing a benchmark on the client device 102 representing operations performed by the lens creation or complex lens operations or retrieving a performance metric indicating how the benchmark performed on devices similar to the client device 102 in the past. The configuration rule evaluation module 416 determines that the performance metric exceeds a minimum performance threshold indicated by the first device property rule. In response to determining that determining that the performance metric exceeds the minimum performance threshold indicated by the first device property rule, the configuration rule evaluation module 416 enables e lens creation or complex lens operations for the client.

In some embodiments, the feature selection module 411 selects, as the feature, an upload size for the client device 102 that controls how large a given video or image can be that is uploaded by the client device 102. A first feature may correspond to enabling a 4 megabyte upload video or image file, a second feature may correspond to enabling a 5 megabyte upload video or image file, and a third feature may correspond to enabling a 2 megabyte upload video or image file. Each of the first, second and third features may be associated with a different configuration rule. The configuration rule selection module 419 may determine whether the first feature is associated with a configuration rule that is satisfied before evaluating the second and third features.

In an embodiment, the first feature is associated with a first configuration rule that includes the following Boolean expression (application version is greater than 10 AND bandwidth available to the client device 102 is greater than 1 Mbps AND (the user is a professional user OR the messaging application installed on the client device 102 is beta build)). If the configuration rule evaluation module 416 determines that this Boolean expression of the first configuration rule is satisfied, the feature action module 418 is instructed to enable the first feature on the client device 102. In an embodiment, the second feature is associated with a second configuration rule that includes the following Boolean expression (application version is greater than 10 AND user is an application developer of the messaging client application 104 AND bandwidth available to the client device 102 is greater than 2 Mbps). If the configuration rule evaluation module 416 determines that this Boolean expression of the second configuration rule is satisfied, the feature action module 418 is instructed to enable the second feature on the client device 102. In an embodiment, the third feature is associated with a third configuration rule that includes the following Boolean expression (application version is greater than 7 AND the user is located in a specified country, such as Brazil AND bandwidth available to the client device 102 is less than 512 kbps). If the configuration rule evaluation module 416 determines that this Boolean expression of the third configuration rule is satisfied; the feature action module 418 is instructed to enable the third feature on the client device 102.

In some embodiments, the feature selection module 411 selects a feature based on what is commonly enabled among a group of devices that are associated with a collection of friends. For example, if a majority of friends in a given group have a given feature enabled that allows video decoding or transcoding using a first decoding or transcoding technique, other users in the same group of friends may also have the same feature selected. The other users may have capabilities that allow a second feature to be enabled that allows for video decoding or transcoding using a second decoding or transcoding technique, wherein the second decoding or transcoding technique is more complex than the first decoding or transcoding technique. But because the majority of users in the group have the given feature enabled, the feature selection module 411 selects the given feature rather than the second feature to be enabled on the client devices 102 of the other users. In this way, all the users in the particular group are able to share media with each other in the same format that each of the users can process.

Figure 5:
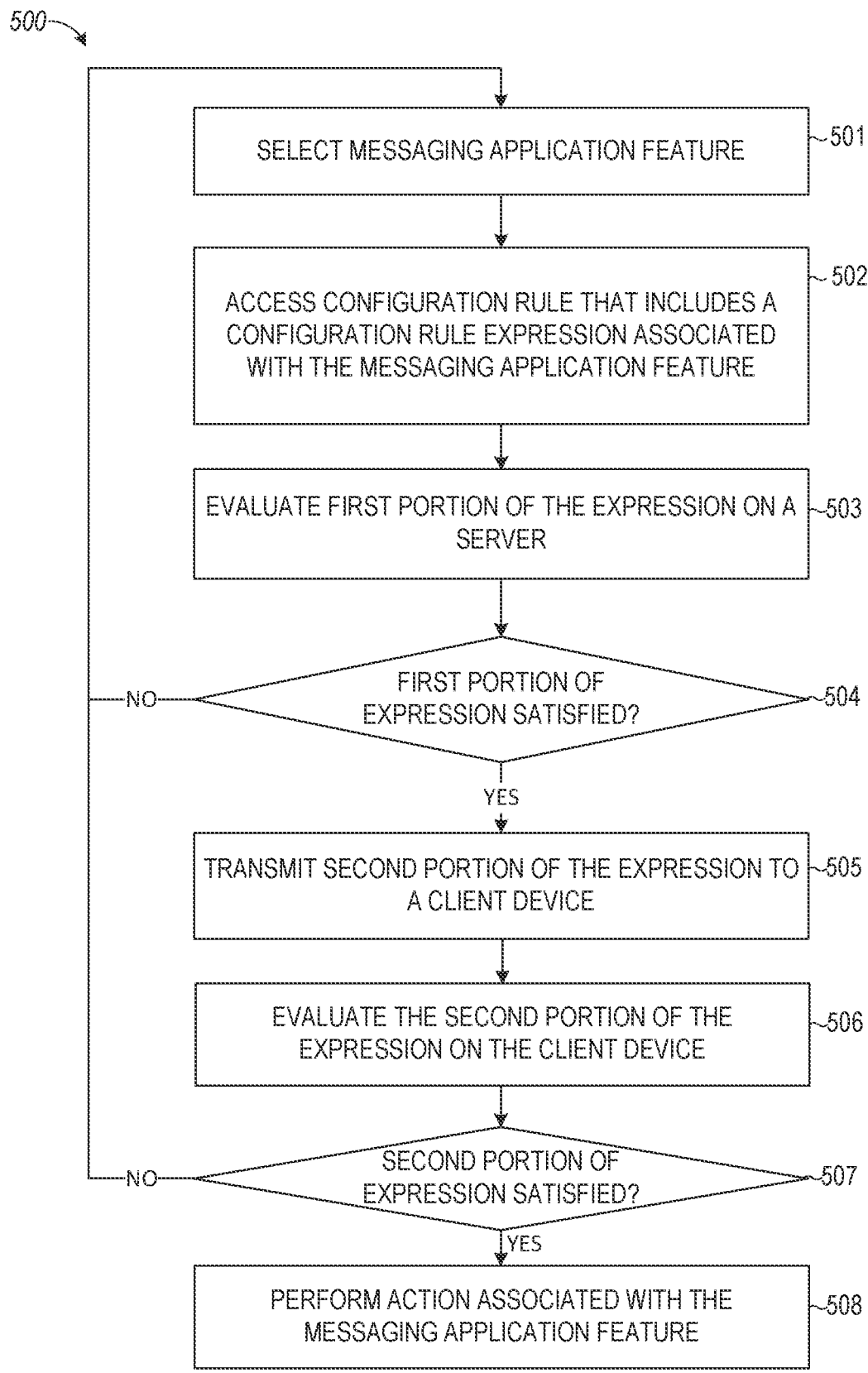
FIGS. 5 and 6 are flowcharts illustrating example operations of the selective feature enabling system, according to example embodiments.

FIG. 5 is a flowchart illustrating example operations of the selective feature enabling system 124 in performing a process 500, according to example embodiments. The process 500 may be embodied in computer-readable instructions for execution by one or more processors such that the operations of the process 500 may be performed in part or in whole by the functional components of the messaging server system 108 and/or messaging client application 104; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of the process 500 can be in parallel, out of order, or entirely omitted.

At operation 501, the selective feature enabling system 124 selects a messaging application feature. For example, the feature selection module 411 selects a given feature of the messaging client application 104 to be enabled.

At operation 502, the selective feature enabling system 124 accesses a configuration rule that includes a configuration rule expression associated with the messaging application feature. For example, the configuration rule selection module 419 retrieves one or more configuration rules that are associated with the selected feature provided by the feature selection module 411.

At operation 503, the selective feature enabling system 124 evaluates a first portion of the expression on a server. For example, the configuration rule evaluation module 416 obtains data for one or more parameters of the configuration rule expression from the user information module 414 and/or device properties module 412 and determines whether a Boolean expression in the configuration rule is satisfied.

At operation 504, the selective feature enabling system 124 determines if the first portion of the expression is satisfied. In response to determining that the first portion of the expression is satisfied, the process continues to operation 505, otherwise the process continues to operation 501.

At operation 505, the selective feature enabling system 124 transmits a second portion of the expression to a client device 102. For example, the configuration rule evaluation module 416 identifies a portion of the configuration rule that needs to be evaluated on the client device 102, such as a benchmark that needs to be run on the client device 102 to determine the performance of the benchmark or the currently available bandwidth, battery level or storage space on the client device 102.

At operation 506, the selective feature enabling system 124 evaluates the second portion of the expression on the client device 102. For example, the configuration rule evaluation module 416 instructs the client device 102 to evaluate the portion of the rule and transmit an indication of whether the portion of the rule (e.g., the Boolean expression portion) matches the data obtained on the client device 102 and evaluates to be TRUE or FALSE.

At operation 507, the selective feature enabling system 124 determines if the second portion of the expression is satisfied. In response to determining that the second portion of the expression is satisfied, the process continues to operation 508, otherwise the process continues to operation 501.

At operation 508, the selective feature enabling system 124 performs an action associated with the messaging application feature. For example, the feature action module 418 enables or disables or modifies the feature of the messaging client application 104 on the client device 102, such as by sending code segments for implementing and executing the selected feature on the client device 102.

Figure 6:
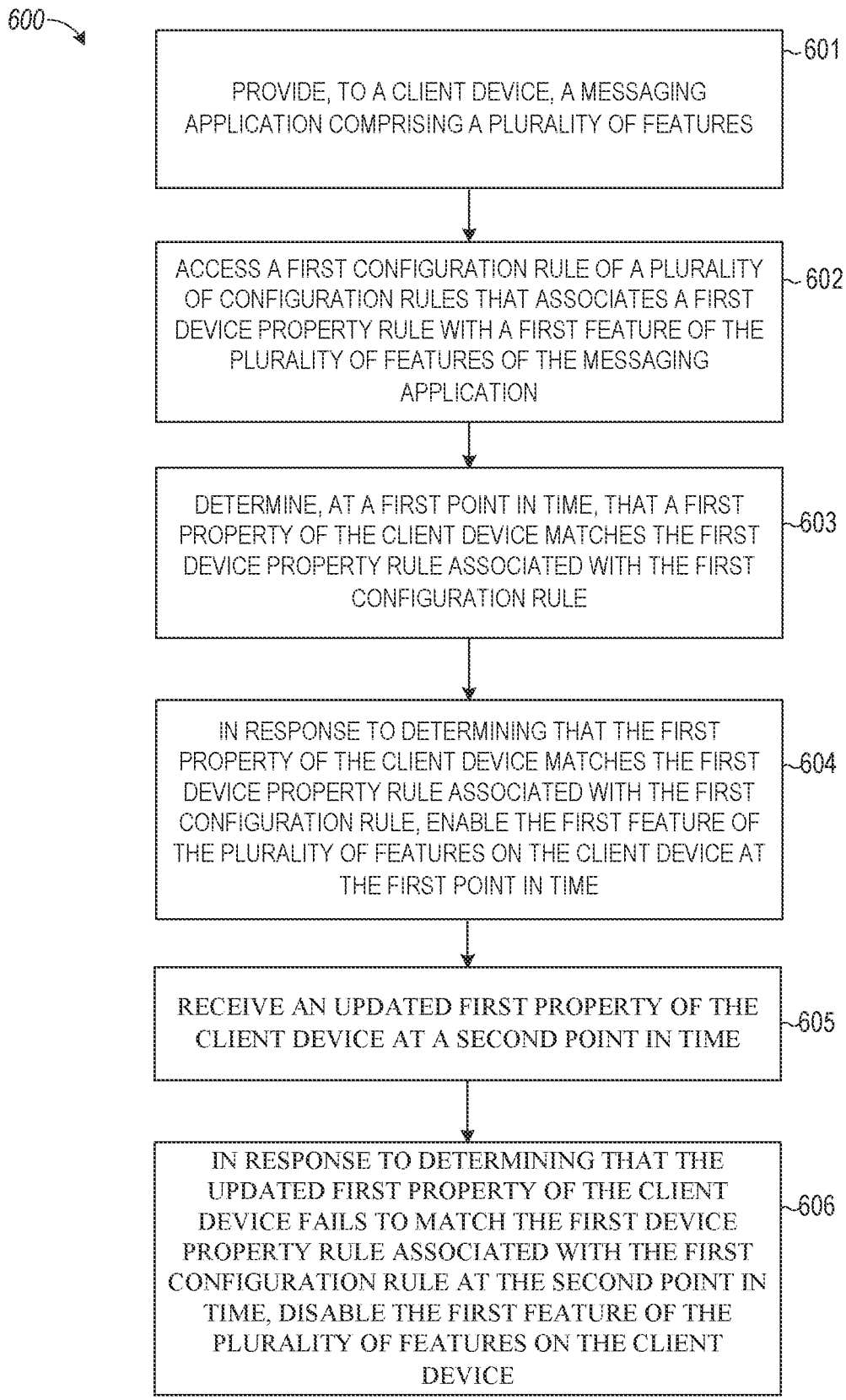

FIG. 6 is a flowchart illustrating example operations of the selective feature enabling system 124 in performing a process 600, according to example embodiments. The process 600 may be embodied in computer-readable instructions for execution by one or more processors such that the operations of the process 600 may be performed in part or in whole by the functional components of the messaging server system 108 and/or messaging client application 104; accordingly, the process 600 is described below by way of example with reference thereto. However, in other embodiments, at least some of the operations of the process 600 may be deployed on various other hardware configurations. The process 600 is therefore not intended to be limited to the messaging server system 108 and can be implemented in whole, or in part, by any other component. Some or all of the operations of the process 600 can be in parallel, out of order, or entirely omitted.

At operation 601, the selective feature enabling system 124 provides, to a client device 102, a messaging application comprising a plurality of features.

At operation 602, the selective feature enabling system 124 accesses a first configuration rule of a plurality of configuration rules that associates a first device property rule with a first feature of the plurality of features of the messaging application.

At operation 603, the selective feature enabling system 124 determines that a first property of the client device 102 matches the first device property rule associated with the first configuration rule at a first point in time.

At operation 604, the selective feature enabling system 124 enables the first feature of the plurality of features on the client device 102 in response to determining that the first property of the client device 102 matches the first device property rule associated with the first configuration rule at the first point in time.

At operation 605, the selective feature enabling system 124 receives an updated first property of the client device 102 at a second point in time.

At operation 606, the selective feature enabling system 124 in response to determining that the updated first property of the client device 102 fails to match the first device property rule associated with the first configuration rule at the second point in time, disables the first feature of the plurality of features on the client device 102.

Figure 7:
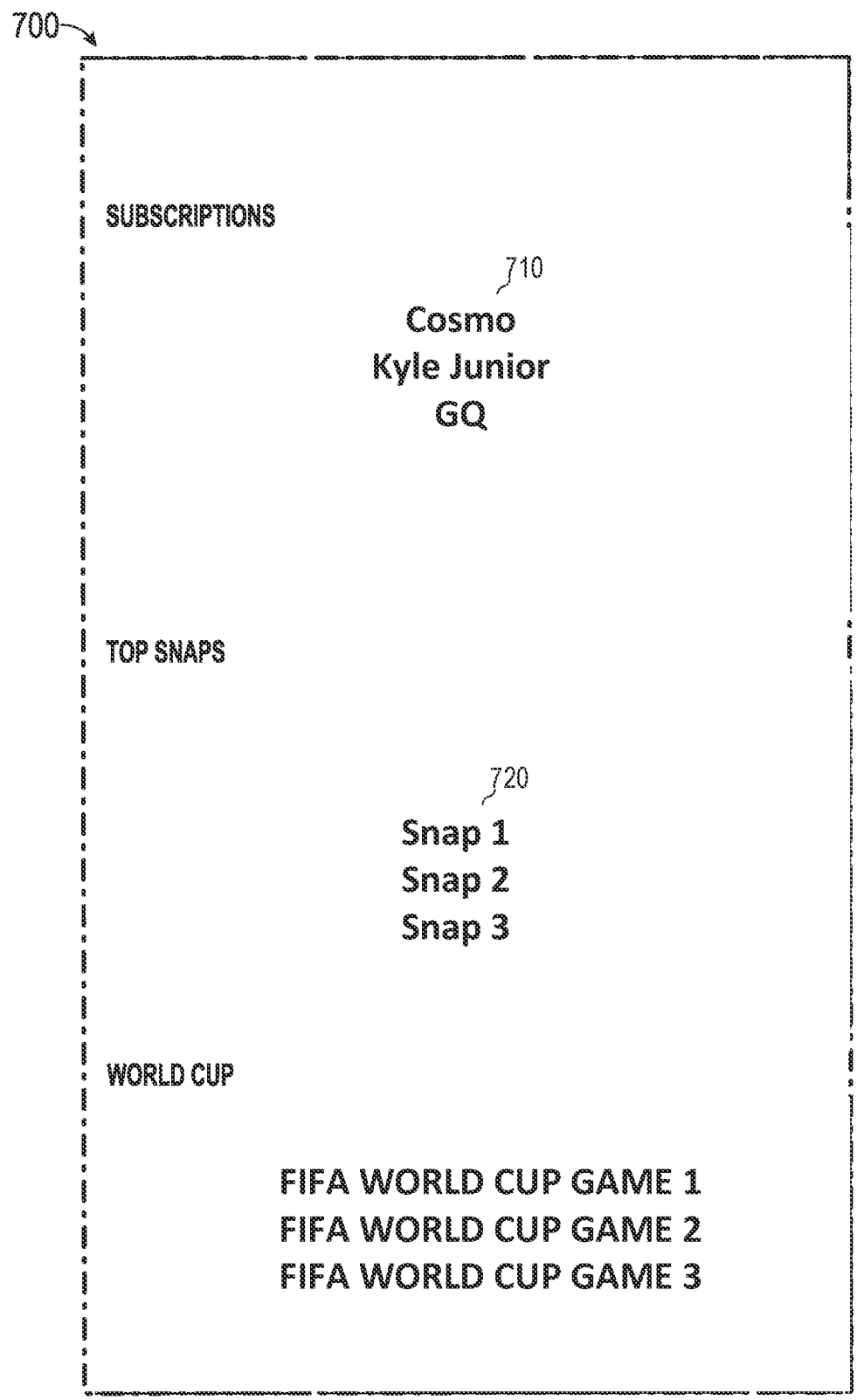
FIGS. 7 and 8 are illustrative inputs and outputs of the selective feature enabling system, according to example embodiments.
Figure 8:
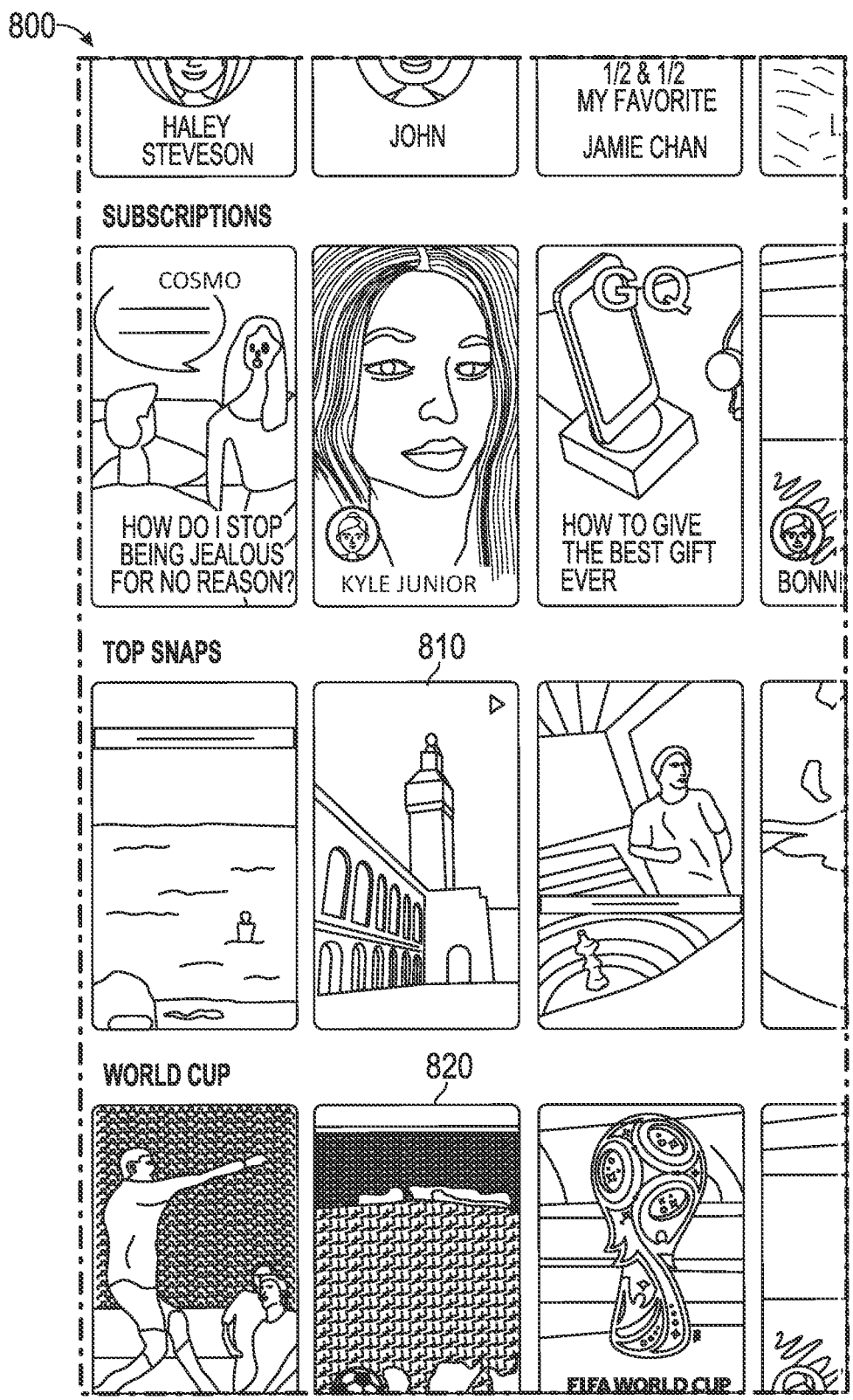

FIGS. 7 and 8 show illustrative inputs and outputs of the selective feature enabling system 124, according to example embodiments. The inputs and outputs shown in FIGS. 7 and 8 can be implemented by the messaging client application 104. A graphical user interface 700 shown in FIG. 7 is presented by the messaging client application 104 in response to receiving a user request to access media (e.g., videos and/or images) uploaded and shared by other users of the messaging client application 104. In response to, or prior to receiving this request, the selective feature enabling system 124 determines whether a feature of the graphical user interface 700 is to be enabled. The feature may correspond to prefetching or downloading thumbnails or videos of each section of the graphical user interface 700 to the client device 102. If the feature is not enabled (e.g., because the selective feature enabling system 124 determines that the client properties and/or user information 221 do not satisfy and do not match an expression in the corresponding configuration rule), as shown in the graphical user interface 700, only selectable text portions 710 and 720 of each section are presented, providing titles of the corresponding media. A user can select a given text portion 710 or 720 to then cause the client device 102 to retrieve the corresponding media (e.g., video or image).

If the feature is enabled (e.g., because the selective feature enabling system 124 determines that the client properties and/or user information 221 do satisfy and do match the expression in a corresponding configuration rule), as shown in the graphical user interface 800 (FIG. 8), the client device 102 prefetches the corresponding thumbnail images and videos 810 and 820 of each title represented in FIG. 7. In this way, as soon as the user accesses the graphical user interface 800, the thumbnails, images and/or videos 810 are presented to the user instead of simple text. In an embodiment, options may be included or excluded from the graphical user interface 800 depending on whether they correspond to an enabled or disabled feature of the messaging client application 104. In some embodiments, the graphical user interface 700 (FIG. 7) is presented on a first client device 102 for which the selective feature enabling system 124 determines that the client properties and/or user information 221 do not satisfy and do not match an expression in a corresponding configuration rule. Concurrently with the graphical user interface 700 being presented on the first client device 102, the graphical user interface 800 shown in FIG. 8 is presented on a second client device 102 for which the selective feature enabling system 124 determines that the client properties and/or user information 221 do satisfy and do match the expression in the corresponding configuration rule.

Figure 9:
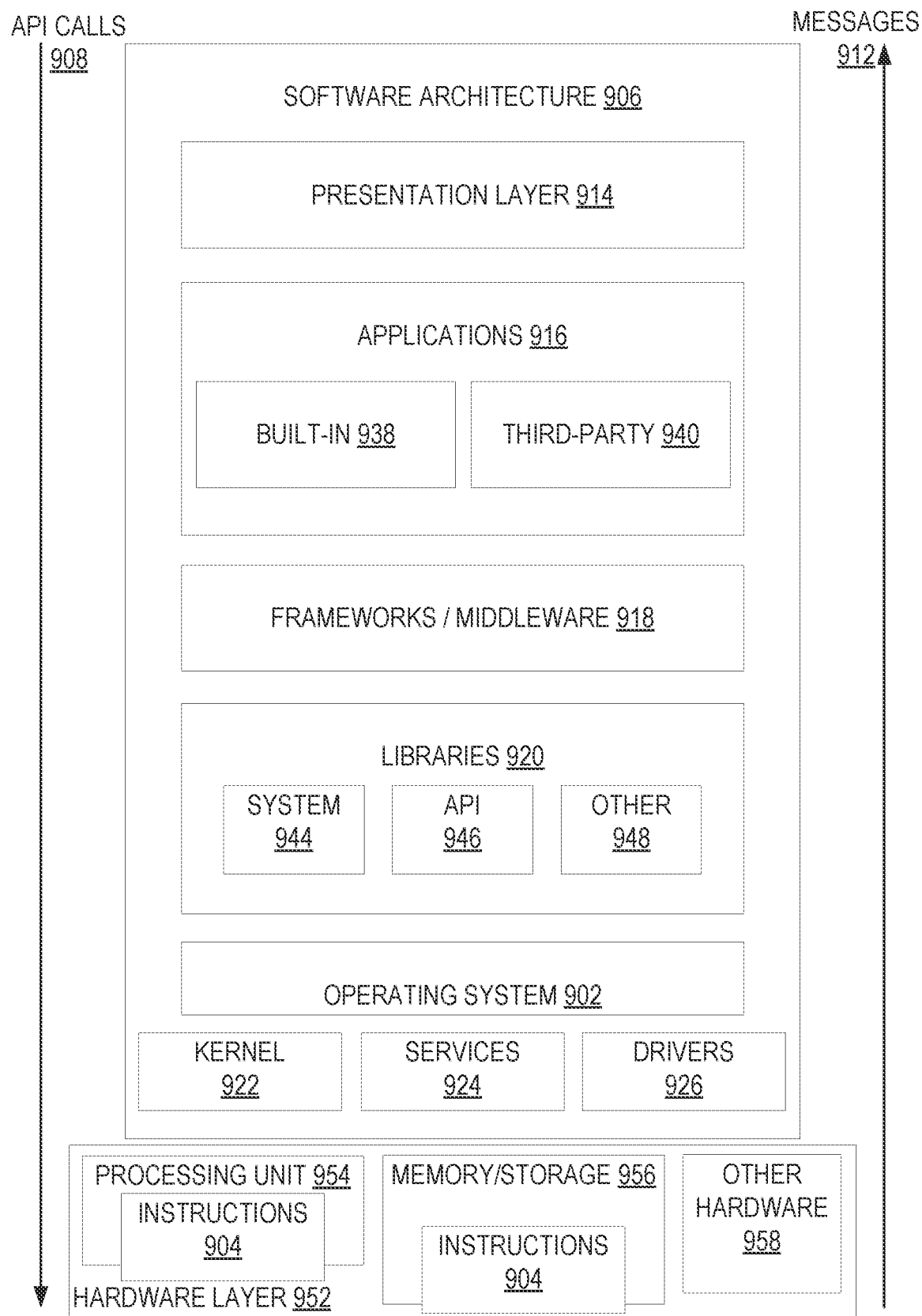
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture, and it will be appreciated that many other architectures may be implemented to facilitate the functionality described herein. The software architecture 906 may execute on hardware such as a machine 1000 of FIG. 10 that includes, among other things, processors 1004, memory 1006 and input/output (I/O) components 1018. A representative hardware layer 952 is illustrated and can represent, for example, the machine 1000 of FIG. 10. The representative hardware layer 952 includes a processing unit 954 having associated executable instructions 904. The executable instructions 904 represent the executable instructions of the software architecture 906, including implementation of the methods, components, and so forth described herein. The hardware layer 952 also includes memory and/or storage modules memory/storage 956, which also have the executable instructions 904, The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature, and not all software architectures have all layers. For example, some mobile or special-purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than by interfacing directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media formats such as MPEG4, H.264, MP3, AAC, AMR, JPG, PNG), graphics libraries (e.g., an OpenGL framework that may be used to render two-dimensional and three-dimensional graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by, the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. The third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as the operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as the presentation layer 914, In these systems, the application/component "logic" can be separated from the aspects of the application/component that interact with a user.

Figure 10:
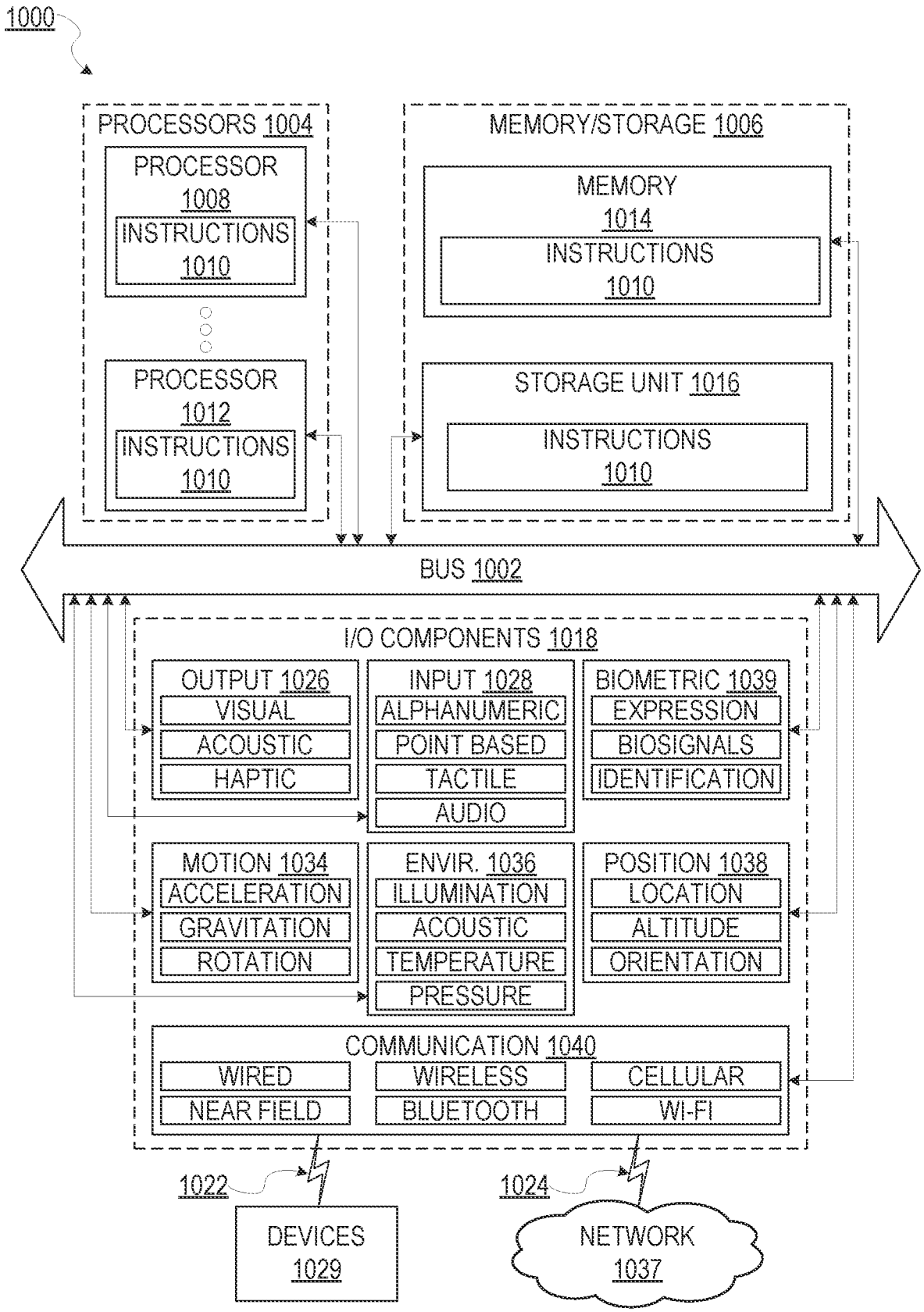
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors 1008 (sometimes referred to as "cores") that may execute instructions 1010 contemporaneously. Although FIG. 10 shows multiple processors 1004, the machine 1000 may include a single processor 1008 with a single core, a single processor 1008 with multiple cores (e.g., a multi-core processor), multiple processors 1004 with a single core, multiple processors 1004 with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor 1008's cache memory), or any suitable combination thereof, during execution thereof by the machine 1000. Accordingly, the memory 1014, the storage unit 1016, and the memory of the processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine 1000. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion, and the grouping is in no way limiting. In various example embodiments, the I/O components 1018 may include output components 1026 and input components 1028. The output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., by voice identification, retinal identification, facial identification, fingerprint identification, or electroencephalogram-based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via a coupling 1024 and a coupling 1022, respectively. For example, the communication components 1040 may include a network interface component or other suitable device to interface with the network 1037, In further examples, the communication components 1040 may include wired communication components, wireless communication components, cellular communication components, near field communication (NFC) components, Bluetooth®, components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

Glossary

"CARRIER SIGNAL", in this context, refers to any intangible medium that is capable of storing, encoding, or carrying transitory or non-transitory instructions 1010 for execution by the machine 1000, and includes digital or analog communications signals or other intangible media to facilitate communication of such instructions 1010. Instructions 1010 may be transmitted or received over the network 1037 using a transitory or non-transitory transmission medium via a network interface device and using any one of a number of well-known transfer protocols.

"CLIENT DEVICE", in this context, refers to any machine 1000 that interfaces to a communications network 1037 to obtain resources from one or more server systems or other client devices 102. A client device 102 may be, but is not limited to, a mobile phone, desktop computer, laptop, PDA, smart phone, tablet, ultra book, netbook, laptop, multi-processor system, microprocessor-based or programmable consumer electronics system, game console, set-top box, or any other communication device that a user may use to access a network 1037.

"COMMUNICATIONS NETWORK", in this context, refers to one or more portions of a network 1037 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1037 or a portion of a network may include a wireless or cellular network and the coupling may be a Code Division Multiple Access (CDMA) connection, a Global System for Mobile communications ((SM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE", in this context, refers to a message 300 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM", in this context, refers to a component, a device, or other tangible media able to store instructions 1010 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT", in this context, refers to a device, physical entity, or logic having boundaries defined by function or subroutine calls, branch points. APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC, A hardware component may also include programmable logic or circuitry that is temporarily configured by software to perform certain operations. For example, a hardware component may include software executed by a general-purpose processor 1004 or other programmable processor. Once configured by such software, hardware components become specific machines (or specific components of a machine) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor 1008 configured by software to become a special-purpose processor, the general-purpose processor 1008 may be configured as respectively different special-purpose processors (e.g., comprising different hardware components) at different times. Software accordingly configures a particular processor or processors 1004, for example, to constitute a particular hardware component at one instant of time and to constitute a different hardware component at a different instant of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1037 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm).

In other example embodiments, the processors 1004 or processor-implemented components may be distributed across a number of geographic locations.

"PROCESSOR", in this context, refers to any circuit or virtual circuit (a physical circuit emulated by logic executing on an actual processor 1008) that manipulates data values according to control signals (e.g., "commands," "op codes," "machine code," etc.) and which produces corresponding output signals that are applied to operate a machine 1000. A processor 1008 may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (MC), or any combination thereof, A processor 1008 may further be a multi-core processor having two or more independent processors 1008 (sometimes referred to as "cores") that may execute instructions 1010 contemporaneously.

"TIME STAMP", in this context, refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A system comprising:
   one or more processors configured to perform operations comprising:
   accessing user information that represents user behavior comprising one or more prior interactions performed by the user with one or more features of a plurality of features of a messaging application;
   based on the one or more prior interactions performed by the user represented by the accessed user information, inferring that a user of a client device is interested in a first feature of the plurality of features of a messaging application implemented on the client device;
   in response to inferring that the user is interested in the first feature, accessing a first configuration rule of a plurality of configuration rules that associates a first device property rule with the first feature of the plurality of features of the messaging application;
   determining that a first property of the client device matches the first device property rule associated with the first configuration rule; and
   in response to determining that the first property of the client device matches the first device property rule associated with the first configuration rule, enabling the first feature of the plurality of features on the client device.

2. The system of claim 1, wherein the first device property rule comprises a specified location or a bandwidth with the first feature of the plurality of features of the messaging application, and wherein the operations further comprise:
   providing, to a client device, a messaging application comprising the plurality of features;
   comparing a current location of the client device to the specified location in the first device property rule or comparing an available bandwidth of the client device to the bandwidth in the first device property rule; and
   in response to determining that an updated first property of the client device fails to match the first device property rule associated with the first configuration rule, disabling the first feature of the plurality of features on the client device.

3. The system of claim 2, wherein the operations further comprise:
accessing a second configuration rule of a plurality of configuration rules that associates a combination of a second device property rule, a location of a device rule, and a user property rule with a second feature of the plurality of features of the messaging application;
determining that a second property of the client device, a location of the client device, and a user property of a user of the client device fails to match the combination of the second device property rule, the location of the device rule, and the user property rule associated with the second configuration rule; and
in response to determining that the second property of the client device, the location of the client device and the user property of the user of the client device fails to match the combination of the second device property rule, the location of the device rule, and the user property rule associated with the second configuration rule, disabling the second feature of the plurality of features on the client device.

4. The system of claim 1, wherein the operations further comprise generating, for display on the client device, a graphical user interface of a messaging application that includes an option to access the first feature without including an option to access a second feature associated with a second configuration rule.

5. The system of claim 4, wherein the operations further comprise:
determining that a first property and a second property of another client device and a user property of another user of the another client device satisfy the first and second configuration rules;
in response to determining that the first property and the second property of the another client device and the user property of the another user of the another client device satisfy the first and second configuration rules, enabling the first and second features on the another client device; and
generating, for display on the another client device, the graphical user interface of the messaging application that includes options to access the first and second features.

6. The system of claim 1, wherein enabling the first feature comprises transmitting application code associated the first feature to the client device to allow the client device to launch the first feature by executing the application code associated with the first feature.

7. The system of claim 1, wherein the first configuration rule includes an expression with a first portion associated with the first device property rule and a second portion associated with a second device property rule, wherein the first portion is evaluated by a server and the second portion is evaluated by the client device.

8. The system of claim 7, wherein the first portion is evaluated by:
retrieving the first property of the client device from a storage device on a server; and
comparing the retrieved first property to the first device property rule in the first portion.

9. The system of claim 8, wherein the second portion is evaluated by the client device in response to determining that the first property matches the first device property rule, and wherein the second portion is evaluated by:
transmitting the second portion to the client device; and causing the client device to:
determine the second property of the client device; and
compare the second property of the client device to the second device property rule in the second portion.

10. The system of claim 1, wherein the first feature of the messaging application is disabled by default when a messaging application is provided to the client device.

11. The system of claim 1, wherein the first feature comprises a graphical eraser operation that enables a user to erase portions of an image captured by the client device.

12. The system of claim 11, wherein determining that the first property of the client device matches the first device property rule associated with the first configuration rule comprises:
retrieving information indicating a performance metric of the graphical eraser operation by executing a benchmark on the client device representing operations performed by the graphical eraser operation;
determining that the performance metric exceeds a minimum performance threshold indicated by the first device property rule; and
in response to determining that the performance metric exceeds the minimum performance threshold indicated by the first device property rule, enabling the graphical eraser operation for the client.

13. The system of claim 1, wherein the operations further comprise:
generating for display a graphical user interface of a messaging application with an option to access the first feature; and
removing the option from the display of the graphical user interface at another point in time.

14. The system of claim 1, wherein determining that the first property of the client device matches the first device property rule associated with the first configuration rule comprises obtaining at least one of processor capabilities of the client device, operating system capabilities of the client device, current battery level of the client device, amount of free memory on the client device, video encoding capabilities of the client device, or a benchmark performance metric of the client device.

15. The system of claim 1, wherein the first configuration rule is selected from the plurality of configuration rules based on a rank associated with each of the plurality of configuration rules.

16. The system of claim 1, wherein the first feature comprises object recognition of an image stored on the client device, wherein the first configuration rule associates a plurality of device property rules including the first device property rule with the first feature, and wherein the operations further comprise:
receiving, from the client device, a current battery level and current amount of available storage;
determining, by a server, that processing capabilities of the client device exceed threshold processing capabilities indicated by the first device property rule, the current battery level exceeds a minimum battery level indicated by a second device property rule of the plurality of device property rules, and the current amount of available storage exceeds a minimum available storage amount indicated by a third device property rule of the plurality of device property rules; and
prior to enabling the first feature on the client device, determining, by the client device, that an updated battery level of the client device exceeds the minimum battery level indicated by the second device property rule and that an updated amount of available storage of the client device exceeds the minimum available storage amount indicated by the third device property rule.

17. The system of claim 1, wherein determining that the first property of the client device matches the first device property rule associated with the first configuration rule comprises:
retrieving a benchmark representing behavior of the first feature;
computing a benchmark performance metric by running the benchmark on the client device; and
comparing the computed benchmark performance metric to a specified benchmark performance metric indicated by the first device property rule associated with the first configuration rule.

18. The system of claim 1, wherein the first feature comprises image backup functionality for the client device, wherein determining that the first property of the client device matches the first device property rule associated with the first configuration rule comprises:
retrieving information indicating upload stability data for the client device and a transcoding failure rate of the client device;
determining that the upload stability data exceeds a stability threshold indicated by the first device property rule and that the transcoding failure rate exceeds a transcoding failure rate threshold indicated by the first device property rule; and
in response to determining that the upload stability data exceeds the stability threshold and that the transcoding failure rate exceeds the transcoding failure rate threshold, enabling the image backup functionality for the client device to backup images captured by the client device.

19. A method comprising:
accessing user information that represents user behavior comprising one or more prior interactions performed by the user with one or more features of a plurality of features of a messaging application;
based on the one or more prior interactions performed by the user represented by the accessed user information, inferring that a user of a client device is interested in a first feature of the plurality of features of a messaging application implemented on the client device;
in response to inferring that the user is interested in the first feature, accessing a first configuration rule of a plurality of configuration rules that associates a first device property rule with the first feature of the plurality of features of the messaging application;
determining that a first property of the client device matches the first device property rule associated with the first configuration rule; and
in response to determining that the first property of the client device matches the first device property rule associated with the first configuration rule, enabling the first feature of the plurality of features on the client device.

20. A non-transitory machine-readable storage medium that includes instructions that, when executed by one or more processors of a machine, cause the machine to perform operations comprising:
accessing user information that represents user behavior comprising one or more prior interactions performed by the user with one or more features of a plurality of features of a messaging application;
based on the one or more prior interactions performed by the user represented by the accessed user information, inferring that a user of a client device is interested in a first feature of the plurality of features of a messaging application implemented on the client device;
in response to inferring that the user is interested in the first feature, accessing a first configuration rule of a plurality of configuration rules that associates a first device property rule with the first feature of the plurality of features of the messaging application;
determining that a first property of the client device matches the first device property rule associated with the first configuration rule; and
in response to determining that the first property of the client device matches the first device property rule associated with the first configuration rule, enabling the first feature of the plurality of features on the client device.

* * * * *